United States Patent (12) United States Patent
Murano et al.

(10) Patent No.: US 11,093,618 B2
(45) Date of Patent: Aug. 17, 2021

(54) SYSTEMS AND METHODS FOR USING AN APPLICATION CONTROL PRIORITIZATION INDEX

(71) Applicant: JPMorgan Chase Bank, N.A., New York, NY (US)

(72) Inventors: Angelo Murano, Butler, NJ (US); Linda Sue Nelson, Allen, TX (US)

(73) Assignee: JPMORGAN CHASE BANK, N.A., New York, NY (US)

(*) Notice: Subject to any disclaimer, the term of this patent is extended or adjusted under 35 U.S.C. 154(b) by 156 days.

(21) Appl. No.: 16/168,010

(22) Filed: Oct. 23, 2018

(65) Prior Publication Data
US 2020/0125733 A1    Apr. 23, 2020

(51) Int. Cl.
| | | |
|---|---|---|
| *G06F 21/55* | (2013.01) | |
| *G06F 21/57* | (2013.01) | |
| *G06F 11/36* | (2006.01) | |
| *G06F 11/07* | (2006.01) | |

(Continued)

(52) U.S. Cl.
CPC ........ *G06F 21/577* (2013.01); *G06F 11/0706* (2013.01); *G06F 11/0793* (2013.01); *G06F 11/3604* (2013.01); *G06N 20/00* (2019.01); *G06F 2221/033* (2013.01)

(58) Field of Classification Search
None
See application file for complete search history.

(56) References Cited

U.S. PATENT DOCUMENTS 8,549,036 B2 * 10/2013 O'Connor ........ G06Q 10/06313
                                                    707/776
8,645,263 B1 *  2/2014 Seel ...................... G06Q 10/10
                                                     705/35

(Continued)

OTHER PUBLICATIONS

International Search Report, dated Nov. 29, 2019, from corresponding International Application No. PCT/US2019/050840.

(Continued)

*Primary Examiner* — Venkat Perungavoor
(74) *Attorney, Agent, or Firm* — Greenberg Traurig LLP (57) ABSTRACT

Systems and methods for using an application control prioritization index are disclosed. In one embodiment, in an information processing apparatus comprising at least one computer processor, a method for using an application control prioritization index may include the following: (1) receiving application data for a plurality of computer applications in a computer application portfolio; (2) receiving control data defining a plurality of application vulnerabilities; (3) determining a potential application vulnerability for each computer application based on the control data; (4) receiving a plurality of application attributes for each computer application; (5) determining an impact severity for the application vulnerability based on the application attributes; (6) generating an application control prioritization index score for each computer application based on the potential application vulnerability and the impact severity for the application vulnerability; and (7) generating an application portfolio view for the computer application portfolio based on the application control prioritization index scores.

15 Claims, 3 Drawing Sheets

(51) Int. Cl.
*G06N 20/00* (2019.01)
*G06F 21/51* (2013.01)

(56) References Cited

U.S. PATENT DOCUMENTS

| | | | |
|---|---|---|---|
| 8,789,192 B2* | 7/2014 | LaBumbard | G06F 21/577 |
| | | | 726/25 |
| 9,521,160 B2* | 12/2016 | Ng | H04L 63/1433 |
| 9,535,902 B1 | 1/2017 | Michalak et al. | |
| 10,070,195 B1* | 9/2018 | Brandwine | G06F 21/121 |
| 10,417,712 B2* | 9/2019 | Buccetti | G06Q 40/08 |
| 2001/0001156 A1* | 5/2001 | Leppek | G06F 21/6218 |
| | | | 726/7 |
| 2003/0216926 A1* | 11/2003 | Scotto | G06Q 10/06 |
| | | | 705/7.36 |
| 2009/0287837 A1* | 11/2009 | Felsher | G16H 10/60 |
| | | | 709/229 |
| 2011/0288692 A1* | 11/2011 | Scott | H04L 63/20 |
| | | | 700/297 |
| 2013/0074188 A1* | 3/2013 | Giakouminakis | H04L 63/1433 |
| | | | 726/25 |
| 2014/0245376 A1* | 8/2014 | Hibbert | H04L 63/20 |
| | | | 726/1 |
| 2015/0142509 A1* | 5/2015 | Treacey | G06Q 10/0635 |
| | | | 705/7.28 |
| 2016/0127407 A1* | 5/2016 | Mankovskii | H04L 63/1433 |
| | | | 726/1 |
| 2017/0098086 A1* | 4/2017 | Hoernecke | G06Q 10/0635 |
| 2017/0132329 A1 | 5/2017 | Yakout et al. | |
| 2017/0193239 A1* | 7/2017 | Chari | G06F 21/577 |
| 2017/0206361 A1* | 7/2017 | Zhu | G06F 21/577 |
| 2018/0018602 A1* | 1/2018 | DiMaggio | G16H 10/60 |
| 2018/0219908 A1* | 8/2018 | Tamir | H04L 63/1433 |
| 2018/0270265 A1* | 9/2018 | Sage | H04L 63/102 |
| 2018/0309778 A1* | 10/2018 | Sugarbaker | H04L 43/08 |
| 2020/0092320 A1* | 3/2020 | Yampolskiy | H04L 61/1511 |
| 2020/0134188 A1* | 4/2020 | Bagheri | G06F 21/577 |
| 2020/0285757 A1* | 9/2020 | Bhalla | G06F 21/577 |
| 2020/0304364 A1* | 9/2020 | Tapia | H04W 24/04 |

OTHER PUBLICATIONS

Written Opinion of the International Searching Authority, dated Nov. 29, 2019, from corresponding International Application No. PCT/US2019/050840.

* cited by examiner

| Tier | Application Vulnerability Order of Magnitude | Minor Impact | Significant Impact | Serious Impact | Totals |
|---|---|---|---|---|---|
| 1 | Very | Moderate<br>2 | High<br>74 | Severe<br>1 | 77 |
| 2 | Likely | Moderate<br>64 | High<br>314 | High<br>5 | 383 |
| 3 | Possible | | Moderate<br>36 | | 36 |
| 4 | Unlikely | Low<br>336 | Low<br>502 | Low<br>7 | 845 |
| | Totals | 402 | 926 | 13 | 1341 |

FIGURE 3

SYSTEMS AND METHODS FOR USING AN APPLICATION CONTROL PRIORITIZATION INDEX

BACKGROUND OF THE INVENTION

1. Field of the Invention

Embodiments of the present invention generally relate to systems and methods for using an application control prioritization index.

2. Description of the Related Art

Financial institutions and other organizations often take a "siloed" approach around reporting and addressing application control/cyber gaps. There is no easy way to identify, measure, and prioritize all risks associated with an application, and there is no guarantee that enough resources will be available to address all application control defects. Moreover, the resources that are available may be allocated to items that have a low residual risk, or items that would not present a serious impact if exploited.

SUMMARY OF THE INVENTION

Systems and methods for using an application control prioritization index are disclosed. In one embodiment, in an information processing apparatus comprising at least one computer processor, a method for using an application control prioritization index may include the following: (1) receiving application data for a plurality of computer applications in a computer application portfolio; (2) receiving control data defining a plurality of application vulnerabilities; (3) determining a potential application vulnerability for each computer application based on the control data; (4) receiving a plurality of application attributes for each computer application; (5) determining an impact severity for the application vulnerability based on the application attributes; (6) generating an application control prioritization index score for each computer application based on the potential application vulnerability and the impact severity for the application vulnerability; and (7) generating an application portfolio view for the computer application portfolio based on the application control prioritization index scores.

In one embodiment, the application data may include application assessments, application scans, application code scans, and application controls.

In one embodiment, each element of the control data may be associated with a control weighting.

In one embodiment, the weighting may be based on machine learning.

In one embodiment, the application attributes may include a facing of the computer application and an availability requirement for the computer application.

In one embodiment, the application attributes may include a money movement requirement and an access to highly confidential data requirement.

In one embodiment, the impact severity for each vulnerability may be determined based on the application attributes.

In one embodiment, the method may further include specifying a prioritization for application remediation based on the application control prioritization index score.

In one embodiment, each computer application attribute may be associated with an application attribute weighting.

In one embodiment, the application attribute weighting may be based on machine learning.

In one embodiment, the method may further include identifying one of the computer applications for replacement or retirement based on the application control prioritization index score.

In one embodiment, the application portfolio view may identify a number of computer applications in each of a plurality of application control priority index tiers.

According to another embodiment, a system for using an application control prioritization index may include a plurality of computer applications within a computer network, the plurality of computer applications part of a computer application portfolio; a plurality of data sources storing application data for the plurality of computer applications within a computer network; and an electronic device comprising at least one computer processor. The electronic device may execute a computer program that performs the following: receive application data for the plurality of computer applications in a computer application portfolio; receive control data defining a plurality of application vulnerabilities; determine a potential application vulnerability for each computer application based on the control data; receive a plurality of application attributes for each computer application; determine an impact severity for the application vulnerability based on the application attributes; generate an application control prioritization index score for each computer application based on the potential application vulnerability and the impact severity for the application vulnerability; and generate an application portfolio view for the application portfolio based on the application control prioritization index scores.

In one embodiment, the application data may include application assessments, application scans, application code scans, and application controls.

In one embodiment, each element of the control data may be associated with a control weighting.

In one embodiment, the application attributes may include a facing of the application, an availability requirement for the computer application, a money movement requirement, and an access to highly confidential data requirement.

In one embodiment, the impact severity for each vulnerability may be determined based on the application attributes.

In one embodiment, the computer program further may specify a prioritization for application remediation based on the application control prioritization index score.

In one embodiment, the computer program may identify one of the applications for replacement or retirement based on the application control prioritization index score.

In one embodiment, the application portfolio view may identify a number of applications in each of a plurality of application control priority index tiers.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for using an application control prioritization index are disclosed.

Embodiments are directed to a system and method whereby remediation may be prioritized based on the likelihood and impact of certain control deficiencies of vulnerabilities that, when exploited, may create a serious risk.

Embodiments may provide some or all of the following technical advantages: embodiments may identify, measure, and prioritize key risk items associated with an application; embodiments may measure an organization's overall risk profile; embodiments may identify the impact of approving a remedy extension or risk acceptance/allow; embodiments may identify where resource alignments are needed to address items that pose the most operational risk; embodiments may identify applications that should be part of upcoming access or cyber "uplift" initiatives; embodiments may accelerate decisions around decommissioning an application or prioritization of technology refreshes; embodiments may forecast when, if at all, lower severity items should be addressed; embodiments may incorporate an application's Application Control Prioritization Index, or ACPI, Tier into tollgate decisions; embodiments may track net-new applications as they go through the Secure From the Start (SFTS) process, and may provide the ability to act as a tollgate; and embodiments may provide a holistic view of how many applications have no "key" controls tagged against them.

Embodiments may identify risks. As used herein, a risk is an application or network vulnerability that may be exploited by an internal or external threat vector resulting in unauthorized access, data loss, business disruption, negative financials, and/or reputation damage.

Embodiments may identify "key" control vulnerabilities packaged as "control threat scenarios" that drive the likelihood ("could it happen") of the risk materializing, and may take a "waterfall" approach to determine which tier an application falls into and may align the tier to that of a vulnerability order of magnitude. Illustrative vulnerability orders of magnitude may include very likely, expected, possible, not expected, etc. Other vulnerability order of magnitudes may be used as is necessary and/or desired.

In one embodiment, application attributes (e.g., data classification, a framework or attributes to which the application must adhere, Sarbanes-Oxley (SOX) Act, money movement, etc.) may be used to rate the overall impact of a breach. For example, the overall impact may be rated as minor, moderate, or serious. Other overall impact ratings may be used as is necessary and/or desired.

In one embodiment, depending on the industry, other attributes may be considered as is necessary and/or desired.

Figure 1:
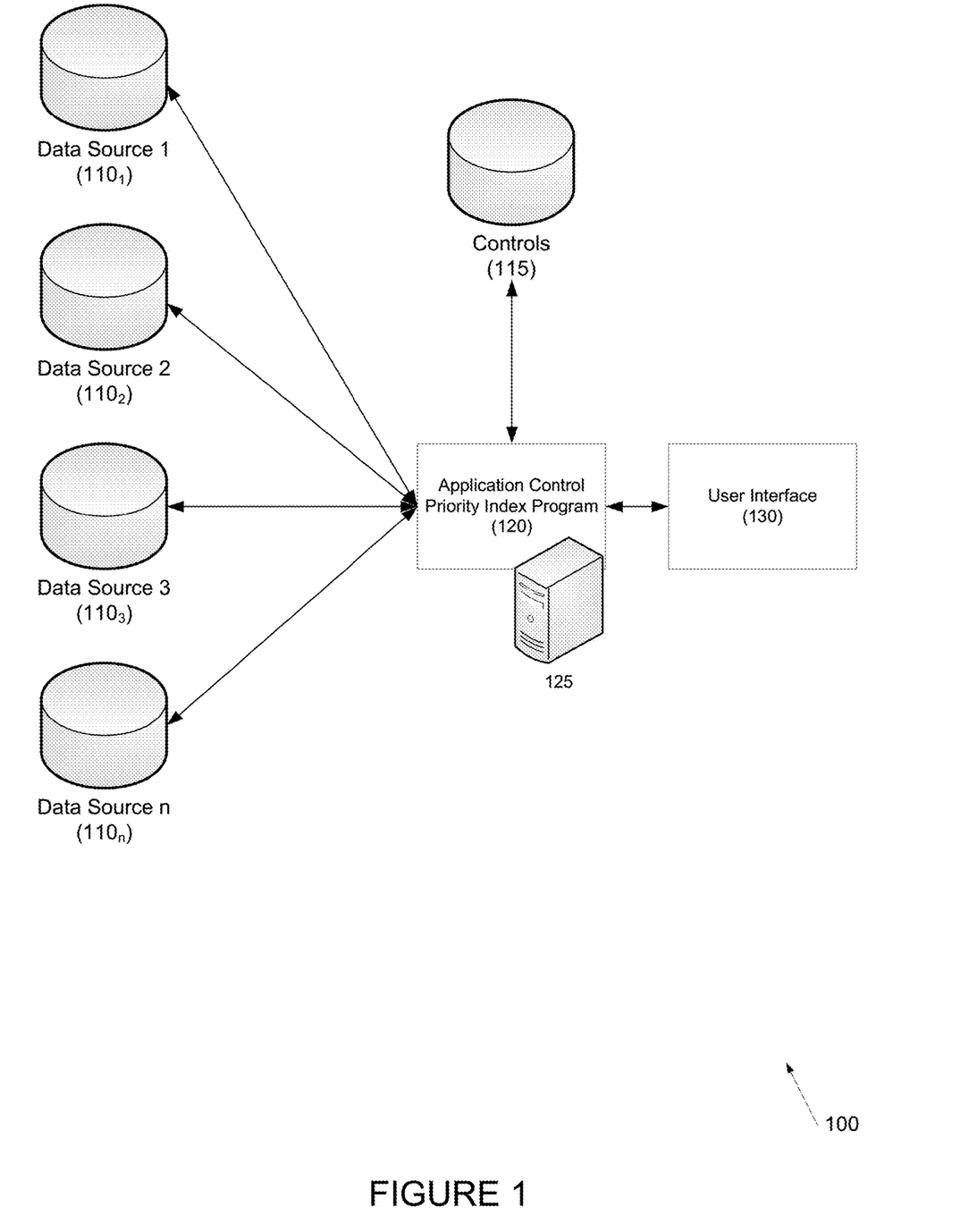
FIG. 1 depicts a block diagram illustrating a system for using an application control prioritization index according to one embodiment.

Referring to FIG. 1, a system for using an application control prioritization index is provided according to one embodiment. System 100 may include one or more data sources $110_1$, $110_2$, $110_3$, ... $110_n$, controls 115, application control priority index (ACPI) computer program or application 120 executed by one or more electronic devices 125 (e.g., servers, workstations, etc.), and user interface 130, which may be one or more of a desktop computer, notebook computer, workstation, tablet computer, smart phone, Internet of Thing (IoT) appliance, etc. In one embodiment, user interface 130 may interact with ACPI program over the Internet.

In one embodiment, data sources 110 may provide information on computer programs and applications so that application vulnerabilities and severities may be assessed. Examples of data provided by data sources 110 include, for example, application inventories, application assessments, application scans (e.g., virus/malware detection, configuration monitoring, patch management, vulnerability information, etc.), application code scans (e.g., BlackDuck scans, Fortify scans, etc.), etc. These types of data are exemplary only, and it should be recognized that additional or different types of data may be used as is necessary and/or desired.

In one embodiment, data sources 110 may provide application attributes, such as whether the applications are external or internal facing, critical availability, whether the application involves the movement of money, whether the application accesses highly confidential data, Sarbanes-Oxley (SOX) compliance, etc. These attributes are exemplary only; other vulnerabilities may be considered based on the environment in which ACPI program 120 operates.

Data from data sources may be based on manual reviews (e.g., self-assessments), machine-based reviews, etc.

In one embodiment, controls 115 may provide control information for the applications, such as defining severity of breaks (e.g., high, medium, low), cyber application security, application access management, infrastructure security resiliency, and security configurations. In one embodiment, the application controls may be used for mapping application level control gaps for cyber, infrastructure and high severity security configuration ACPI control categorization.

In one embodiment, an organization may define each control as is necessary and/or desired. In one embodiment, one or more controls may be based on industry conventions or standards.

In another embodiment, machine learning may be used to define one or more controls based on experiences (e.g., past breaches, realized severities, etc.) within the organization, with another organization, etc.

In one embodiment, the risk severity for vulnerabilities may be based, for example, on whether there is an approved remediation plan, a term for implementing the remediation plan, etc. Vulnerabilities may include infrastructure vulnerabilities, platform vulnerabilities, resiliency vulnerabilities, security vulnerabilities, segregation of duty vulnerabilities, etc. Any other suitable control may be used as is necessary and/or desired.

ACPI program 120 may use the data from the data sources, including, for example, application assessments, application scans, application code scans, etc. and may compare the data to controls 115 to identify one or more vulnerabilities for an application. In one embodiment, the vulnerabilities may be assigned an application vulnerability order of magnitude, such as very likely, expected, possible, not expected, etc. Any other suitable application vulnerability order of magnitude may be used as is necessary and/or desired.

In one embodiment, only vulnerabilities that exceed a certain threshold may be identified. The threshold may be set by controls 115.

For identified vulnerabilities, the severity or impact of the vulnerabilities, should those vulnerabilities be exploited, may be assessed based on application attributes.

For example to determine the severity of a breach, ACPI program 120 may determine impact severity based on whether the application is external facing, whether the application has critical availability (e.g., necessary for a business to operate), whether the application involves the movement of money, whether the application accesses highly confidential data (e.g., personal identifiable information, or PII), etc. to determine a severity rating. Based on the attributes for each application, ACPI program 120 may determine a severity order of magnitude (e.g., high, medium, low).

ACPI program 120 may then generate an ACPI score, and output an application portfolio view for an organization's applications. For example, the application portfolio view may present the number of applications based on a likelihood of a vulnerability and the severity (e.g., minor, significant, serious).

Based on the ACPI score, the ACPI program may specify a prioritization for the remediation of resources, may identify applications for which replacement or retirement should be accelerated, and may tollgate the application for production installations.

Figure 2:
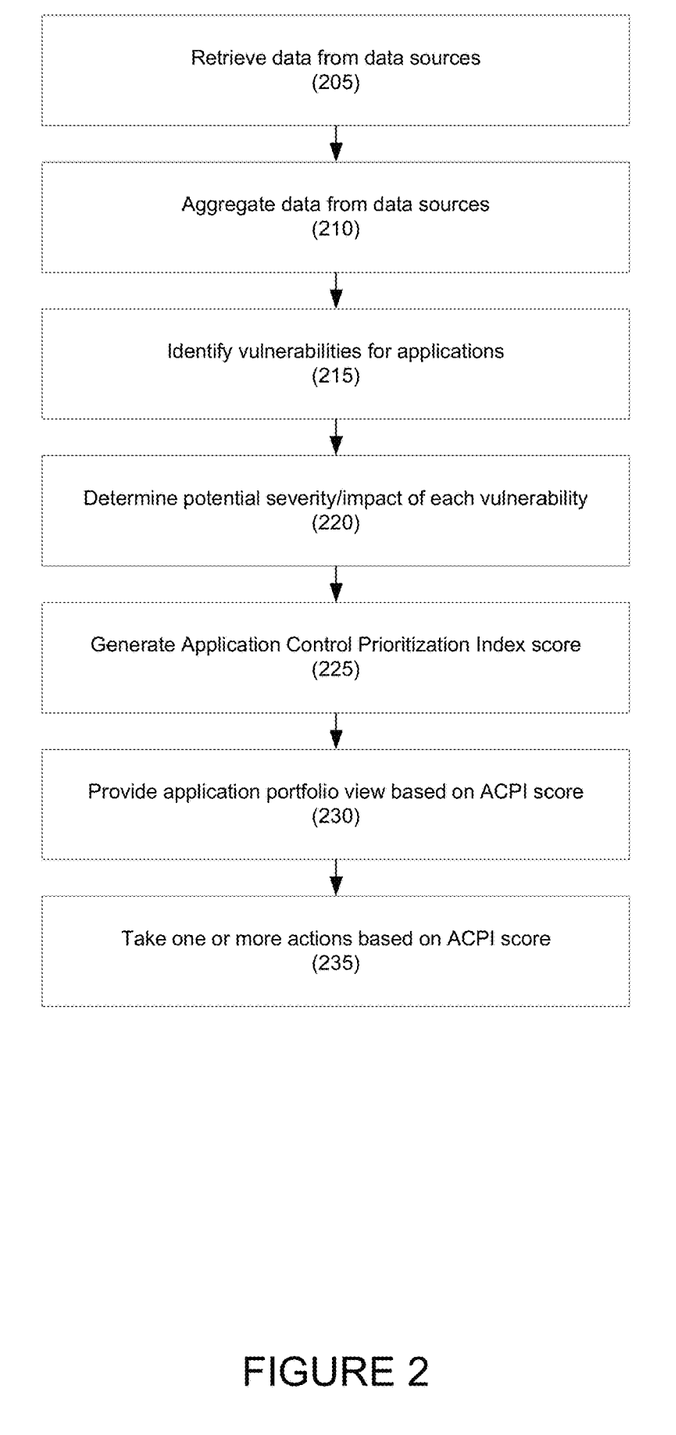
FIG. 2 illustrates a method for using an application control prioritization index according to one embodiment.

Referring to FIG. 2, a method for using an application control prioritization index is provided according to one embodiment.

In step 205, a computer program or application, such as an ACPI program, may retrieve data from one or more data sources. In one embodiment, the data sources may provide, for example, application assessments, application scans, application code scans, the application inventory, application controls, and application attributes.

In step 210, the computer program may aggregate the application data. In one embodiment, additional application level attributes may be created for calculation purposes. For example, external facing applications are defined as applications which were identified by assessment and/or scanning routines as being "Client Facing" or "Internet Facing".

In step 215, the computer program may determine an application vulnerability for each application. For example to determine application vulnerability, information from the data sources (e.g., application assessments, application scans, application code scans, etc.) may be evaluated in view of the application controls that may define the application vulnerabilities. For example, the application controls may define the different severity levels of breaks (e.g., high, medium, low), cyber application security, application access management, infrastructure security resiliency, and security configurations. The evaluation may result in a risk score. Depending on the number of application vulnerabilities, and against which application control the application vulnerability applies, the ACPI program may determine an application vulnerability order of magnitude (e.g., very likely, expected, possible, not expected).

In step 220, the computer program may determine an impact severity for each identified vulnerability. This may be determined based on the application attributes (e.g., external facing, critical availability, involves money movement, accesses highly confidential data, involves SOX, etc.) to determine a severity rating. Based on the attributes for each application, ACPI program 120 may determine an impact severity order of magnitude. (e.g., minor, significant, serious).

In one embodiment, each attribute may be assigned a weighting for determining the impact severity order of magnitude. The weightings may be assigned manually, or may be determined based on machine learning.

For example, a serious severity order of magnitude may be assessed for an application being external facing, CAF, involving money movement and accessing highly confidential data. A significant severity order of magnitude may be assessed for an application being external facing, having critical availability, and involving money movement or accessing highly confidential data. These weightings are illustrative only, and be set based on the environment in which the application operates.

In step 225, the computer program may generate an application control prioritization index assessment or rating for each application based on the application vulnerability order of magnitude and the impact severity order of magnitude.

In one embodiment, different weightings may be given to the application vulnerability order of magnitude and the impact severity order of magnitude. The weightings may be manually selected, may be selected based on machine learning, etc.

In step 230, the computer program may generate an application portfolio view based on the ACPI scores. For example, for some or all applications within an organization's application portfolio, a graphical view of the number of applications in each category may be provided. For example, referring to FIG. 3, a table identifying the application vulnerability order of magnitude versus the impact severity order of magnitude may be presented, and the number of each application in each category may be presented. In one embodiment, the applications may be further classified into a number of ACPI tiers.

Figure 3:
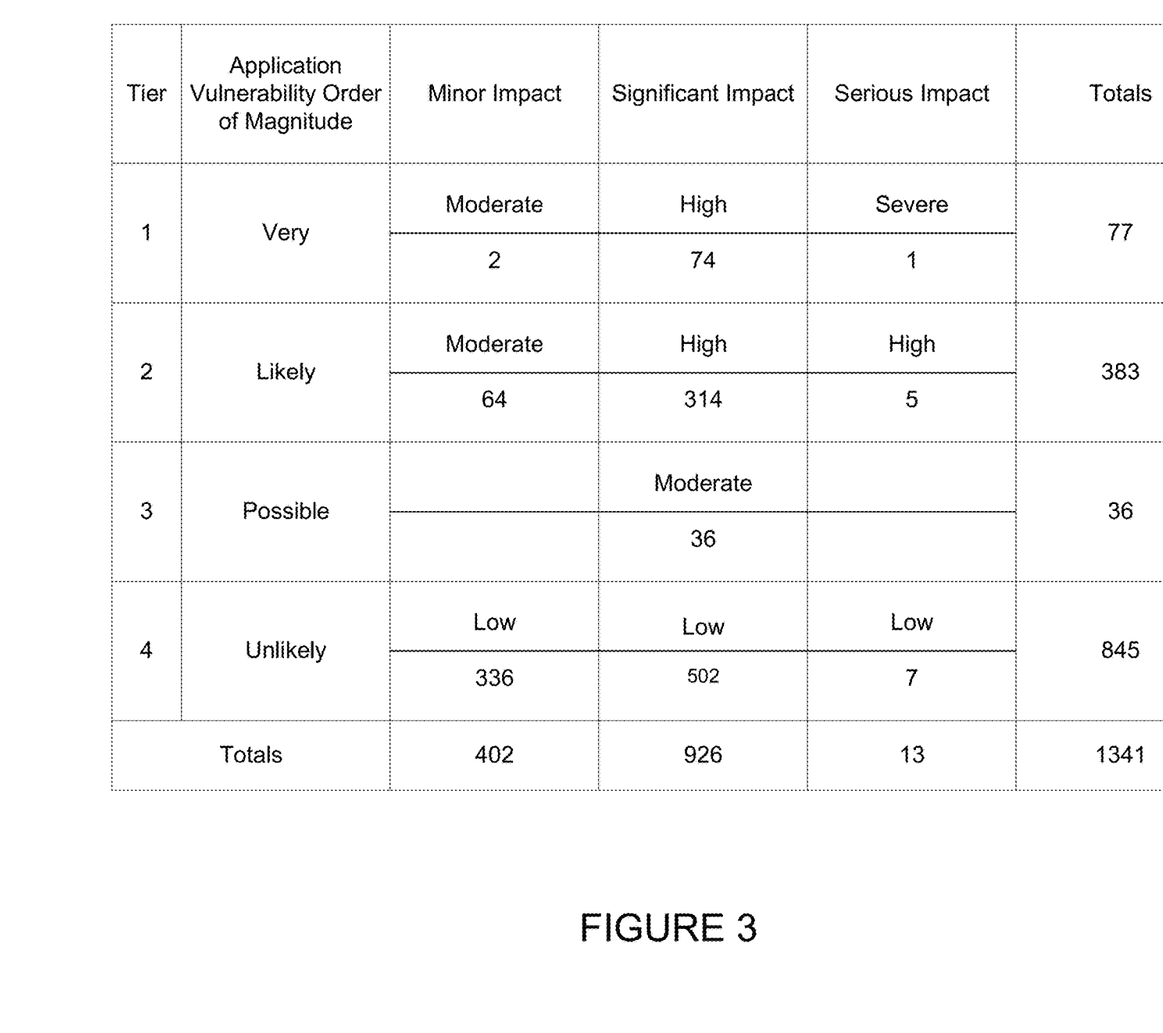
FIG. 3 illustrates an exemplary application portfolio view according to one embodiment.

In one embodiment, definitions for the different application vulnerability orders of magnitude, the impact severity order of magnitude, etc. may be presented by hovering pointer or cursor over the heading, by clicking on the heading, etc. In one embodiment, the applications may be identified by clicking on the respective table space.

The manner in which the data is presented in FIG. 3 is exemplary only; it should be noted that other ways of presenting the data may be used as is necessary and/or desired.

In one embodiment, values may not be assigned to all "boxes" in the table of FIG. 3. For example, applications may first be risk rated as to the inherent risk, and then be assessed as to their actual/residual risk. For applications that are not risk rated/assessed, the risk profile cannot be determined.

In one embodiment, the classification may be fluid in that it may be normalized for the application classification. For example, if there are very few applications in the top tier, the classification may normalize itself to present the "worst of the best" classification and prioritize those applications for action. Conversely, if there are many applications in the top tier, the classification may normalize itself to present the "worst of the worst" classification and prioritize those applications for action.

Referring again go FIG. 2, in step 235, one or more additional actions may be taken based on the ACPI score, the tier, etc. For example, for applications with a high ACPI score, the computer program may specify a prioritization for the remediation of resources, may identify applications for which replacement or retirement should be accelerated, and may tollgates for production installations.

In one embodiment, one or more action may be automated based on machine learning from similar incidents. For example, over time, the results of actual exploitations against applications, either internally or externally, are compiled and these characteristics used to modify the attributes and scoring.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above, may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for using an application control prioritization index, comprising:
    in an information processing apparatus comprising at least one computer processor:
        receiving application data for a plurality of computer applications in a computer application portfolio, wherein the application data comprises at least one of an application assessment, an application scan, an application code scan, and an application control;
        receiving control data defining a plurality of application vulnerabilities for each of the computer applications;
        determining a potential application vulnerability for each computer application based on the control data and the application data for the computer application;
        receiving a plurality of application execution environment attributes for each computer application, wherein the application execution environment attributes comprise at least one of a facing of the computer application, an availability requirement for the computer application, a money movement requirement, and an access to highly confidential data requirement;
        determining a risk severity for the potential application vulnerability based on an availability of an approved remediation plan for the potential application vulnerability;
        determining an impact severity for the potential application vulnerability based on the application execution environment attributes;
        generating an application control prioritization index score for each computer application based on the potential application vulnerability, the risk severity, and the impact severity for the potential application vulnerability; and
        generating an application portfolio view for the computer application portfolio based on the application control prioritization index scores.

2. The method of claim 1, wherein each element of the control data is associated with a control weighting.

3. The method of claim 2, wherein the weighting is based on machine learning.

4. The method of claim 1, further comprising:
specifying a prioritization for application remediation based on the application control prioritization index score.

5. The method of claim 1, wherein each application execution environment attribute is associated with an application attribute weighting.

6. The method of claim 5, wherein the application execution environment attribute weighting is based on machine learning.

7. The method of claim 1, further comprising:
identifying one of the computer applications for replacement or retirement based on the application control prioritization index score.

8. The method of claim 1, wherein the application portfolio view identifies a number of computer applications in each of a plurality of application control priority index tiers.

9. The method of claim 1, wherein the control data defines an application vulnerability based on at least one of a severity levels of a break, cyber application security, application access management, infrastructure security resiliency, and a security configuration.

10. A system for using an application control prioritization index, comprising:
a plurality of computer applications within a computer network, the plurality of computer applications part of a computer application portfolio;
a plurality of data sources storing application data for the plurality of computer applications within a computer network, wherein the application data comprising at least one of an application assessment, an application scan, an application code scan, and an application control;
an electronic device comprising at least one computer processor executing a computer program that performs the following:
receive application data for the plurality of computer applications in a computer application portfolio;
receive control data defining a plurality of application vulnerabilities for each of the computer applications;
determine a potential application vulnerability for each computer application based on the control data and the application data for the computer application;
receive a plurality of application execution environment attributes for each computer application, wherein the application execution environment attributes comprise at least one of a facing of the computer application, an availability requirement for the computer application, a money movement requirement, and an access to highly confidential data requirement;
determine a risk severity for the potential application vulnerability based on an availability of an approved remediation plan for the potential application vulnerability;
determine an impact severity for the potential application vulnerability based on the application execution environment attributes;
generate an application control prioritization index score for each computer application based on the potential application vulnerability, the risk severity, and the impact severity for the potential application vulnerability; and
generate an application portfolio view for the application portfolio based on the application control prioritization index scores.

11. The system of claim 10, wherein each element of the control data is associated with a control weighting.

12. The system of claim 10, wherein the computer program further specifies a prioritization for application remediation based on the application control prioritization index score.

13. The system of claim 10, wherein the computer program further identifies one of the applications for replacement or retirement based on the application control prioritization index score.

14. The system of claim 10, wherein the application portfolio view identifies a number of applications in each of a plurality of application control priority index tiers.

15. The system of claim 10, wherein the control data defines an application vulnerability based on at least one of a severity levels of a break, cyber application security, application access management, infrastructure security resiliency, and a security configuration.

* * * * *